United States Patent [19]

Wernicke et al.

[11] Patent Number: 5,210,008
[45] Date of Patent: May 11, 1993

[54] PHOTOGRAPHIC PROCESS

[75] Inventors: Ubbo Wernicke, Rösrath Kleineichen; Egon Bachem, Burscheid, both of Fed. Rep. of Germany

[73] Assignee: Agfa Gevaert Aktiengesellschaft, Leverkusen, Fed. Rep. of Germany

[21] Appl. No.: 871,286

[22] Filed: Apr. 20, 1992

[30] Foreign Application Priority Data

May 4, 1991 [DE] Fed. Rep. of Germany ....... 4114591

[51] Int. Cl.$^5$ .............................................. G03C 5/395
[52] U.S. Cl. ................................... 430/398; 430/399; 430/400; 430/421; 430/463
[58] Field of Search ............... 430/398, 399, 400, 421, 430/463

[56] References Cited

U.S. PATENT DOCUMENTS 4,719,173  1/1988  Hahm ................................. 430/398

FOREIGN PATENT DOCUMENTS 3927368  2/1991  Fed. Rep. of Germany ...... 430/398

*Primary Examiner*—Charles L. Bowers, Jr.
*Assistant Examiner*—Mark F. Huff
*Attorney, Agent, or Firm*—Connolly and Hutz

[57] ABSTRACT

A method of processing photographic materials in which development is followed by at least one further chemical treatment preceded and followed by washing and in which the liquid of the washing which follows this chemical treatment is removed in particular from the region of entry of material into this following washing bath and supplied to the material in the region of the preceding washing, preferably the material discharge region of the preceding washing, is distinguished by exceptionally low loss of chemicals.

9 Claims, No Drawings

PHOTOGRAPHIC PROCESS

This invention relates to a method of processing photographic materials in which development is followed by at least one further chemical treatment which is preceded and followed by washing.

For economical and ecological reasons it is aimed to keep the chemical losses in photographic processes as low as possible, for example by replenishing without overflow or by rejuvenating the overflow. Even then, the chemical loss, for example when processing 1000 m² of colour photographic paper, still amounts to 15–20 kg.

These losses are due to the fact that the photographic material in its transition from a chemical bath to the following washing carries about 50 to 200 ml of solution charged with chemicals per m² into the washing.

This transfer of solution is normally counteracted by means of wipers, blowers, vacuum suction and the like. It has also been proposed to limit the losses by concentrating the water enriched with chemicals by evaporating the water until the concentration of the bath from which the chemicals have been removed has been re-established.

This requires a relatively large supply of energy.

It was an object of the present invention to reduce the chemical losses caused by this transfer of chemicals.

This succeeds to a surprisingly high degree by means of a processing method of the type defined above in which liquid is removed from the washing following the chemical treatment, in particular from the region of entry of material into this washing, and is delivered to the material in the region of the preceding washing, preferably the region of material discharge from the preceding washing.

The chemical treatment may consist, for example, of bleaching, fixing, bleach fixing, stabilization or conditioning or a reversal bath or a second development.

In a preferred embodiment of carrying out the process according to the invention, development is followed by (a) washing, (b) bleaching, (c) washing, (d) fixing and (e) washing, and liquid is removed from the material inlet region of washing stage (e) and delivered to the region of material discharge of washing stage (c) and is removed from the region of material inlet of washing stage (c) and delivered to the region of material discharge of washing stage (a).

The process according to the invention may be combined with other processes which reduce the rate at which solution is carried over from one stage to the next or reduce the input of fresh water.

In cases in which the washing rate is less than 1 l/m², it may be advisable to add small quantities of wetting agents of complex formers such as aminopolycarboxylic acids and/or organic phosphonic acids to the water to prevent precipitations and deposits of calcium salts or to add commercially available biocides such as isothiazolinones as protection against the growth of microorganisms or to add antioxidants such as sulphites, hydroxylamine or diethylhydroxylamine as protection against discolouration by oxidation products, or to adjust the pH to values in the range of from 3.5 to 9.5. The additives are preferably introduced into the washing bath at concentrations of from 0.001 to 0.01 mol/l.

For carrying out the process according to the invention, partitions extending transversely to the flow of material are advantageously introduced into the washing tanks. These partitions should reach above the liquid level but leave a narrow gap at the bottom through which the photographic material can travel. The gap at the bottom end of the partition may to a large extent be sealed off from the remainder of the washing tank by squeezing rollers.

The solution which is removed and reused may contain in particular from 10 to 90% of the concentration of chemicals of the bath situated between the point of removal and the point of reintroduction, preferably from 20 to 70%, most preferably from 30 to 60%.

The solution removed from the washing following the chemical treatment is preferably applied to the photographic material above the level of the preceding washing.

The quantity of solution removed is in particular from 30 to 200 ml/m², preferably from 40 to 100 ml/m² of processed photographic material.

EXAMPLES

Example 1 (Comparison)

A commercial colour paper (width 8.9 cm) travelled through a washing tank after it had been developed and bleached and then through a fixing bath tank containing a fixing bath having the following composition:

100 g of $(NH_4)_2S_2O_3$/l and
10 g of $Na_2SO_3$/l.

The volume of the tank was 5 liters, the temperature of the solution was 33° C., the fixing time was 45 s and the rate of feed of paper was 1 m/min.

The material then travelled successively through two water filled tanks (each 5 l in volume). No additional water was supplied. After 115 m of paper had been processed, the $(NH_4)_2S_2O_3$ content in the first of the two water tanks was found to be 12.5 g/l.

At the same time, the concentration of $(NH_4)_2S_2O_3$ in the fixing bath tank had fallen from 100 g/l to 86 g/l.

The loss of $(NH_4)_2S_2O_3$ was therefore about 6.8 g/m² of colour paper.

Example 2

The procedure was the same as in Example 1 but in this case a section 1 liter in volume of the first washing tank was separated off by a partition at the side where the photographic material was introduced. This partition reached above the liquid level and left only a narrow gap at the bottom.

After 115 m of paper (corresponding to 10.24 m²) had passed through the tank, the concentration of $(NH_4)_2S_2O_3$ in this section was found to be 39 g/l.

The concentration of $(NH_4)_2S_2O_3$ in the fixing tank itself had fallen to 86 g/l as in Example 1.

Example 3 (According to the Invention)

The procedure was the same as in Example 2 but in this case a section 1 liter in volume was also separated by a similar partition from the washing tank preceding the fixing bath on the side at which the photographic material left this tank.

60 ml/m² was removed from the separated section of the downstream washing tank by means of a pump and applied onto the paper after leaving the separated section of the preceding washing so that the quantity of liquid entered the separated section of the preceding washing.

After 115 m of paper had been processed, the concentration of $(NH_4)_2S_2O_3$ in the fixing bath was found to be 89 g/l.

Example 4 (According to the Invention)

The procedure was the same as in Example 3 but the separated section of the downstream washing was reduced to 300 ml and the gap was closed to such an extent by two squeezing rollers through which the photographic material travelled that an equalization of liquid level between the separated section and the remaining volume of the washing tank was only just possible.

The quantity of liquid removed and applied again by the pump was 70 ml/m².

After 115 m of paper (corresponding to 10.24 m²) had been processed, the $(NH_4)_2S_2O_3$ concentration in the fixing bath was 93.5 g/l.

The regeneration could be reduced accordingly in a long term operation.

Example 5

A commercial colour paper travelled after development through the stages of washing, a bleaching bath, washing, a fixing bath, a final washing and drying. The bleaching bath used has the following chemical composition:
about 100 g of $NH_4Br/l$ and
about 50 g of $(NH_4)FeEDTA/l$
pH 6.
The volume of the bleaching bath tank was 5 liters, the bleaching time 60 s and the temperature 35° C.

5a Comparison

The material is passed through the tank along the usual U-shaped path. 20 m² of colour paper in the form of a roll 8.9 cm in width are processed. No regeneration is carried out.

The change in chemical composition of the bleaching bath resulting from processing the 20 m² is determined. The changes are due primarily to water being carried into the bath by the photographic material and bleaching bath being carried into the following washing by the photographic material.

Analytical values: Before processing: 98.5 g $NH_4Br/l$. After processing: 75.5 g $NH_4Br/l$.

5b According to the Invention

The material is not carried from one tank to the next along the usual direct U-shaped path; instead, the material is passed through 5 loosely fixed pairs of rollers at the exit from the first washing tank (before the bleaching bath) and at the exit from the bleaching bath tank. These rollers are arranged pairwise one above the other above the liquid level and rotate at the rate corresponding to the rate of forward feed of the material.

50 ml of water per square meter of material is sprayed evenly on to the uppermost pair of rollers of the assembly situated above the level of the bleaching bath.

Most of the water is collected at the lower end of the apparatus and pumped onto an identical apparatus which is situated above the level of the washing tank before the bleaching bath.

20 m² of colour paper are again processed and the change in ammonium bromide concentration is examined analytically.

Analytical results: Before processing: 98.5 g $NH_4Br/l$. After processing: 87 g $NH_4Br/l$.

The loss in chemicals due to their being carried from one bath to the next is approximately halved by the development process described.

| | | |
|---|---|---|
| Loss per 20 m² (normal processing) | 98.5 75.5 | |
| | 23.0 g/l | 23.0 × 5 = 115 g |
| Loss per 20 m² by the process according to the invention | 98.5 87.8 | |
| | 10.7 g/l | 10.7 × 5 = 53.5 g |

We claim:
1. In a method of processing of photographic material wherein development is followed by
at least one further chemical treatment which is preceded and followed by washing operations, the steps comprising
removing liquid from the region of entry of photographic material into the following washing operation and
supplying liquid to the region of discharge of material of the preceding washing operation.

2. A process according to claim 1, characterised in that the chemical treatment consists of bleaching, fixing, bleach fixing, stabilization, conditioning, a reversal bath or a second development.

3. A process as claimed in claim 1 wherein development is followed by (a) washing, (b) bleaching, (c) washing, (d) fixing and (e) washing, liquid is removed from the region of entry of material into washing state (e) and delivered to the region of material discharge from washing stage (c) and liquid is removed from the region of entry of material into washing stage (c) and delivered to the region of material discharge from washing stage (a).

4. A process according to claim 1, characterised in that the regions of material entry and of material discharge of the washing operation in tanks are separated from the remaining contents of the tank by partitions inserted in the tank transversely to the direction of processing, which partitions reach above the liquid level of the tank contents and leave a narrow gap at the bottom through which the photographic material can travel.

5. A process according to claim 1, characterised in that the region of material entry and of material discharge of the washing operation in a tank amounts to 5 to 50% of the total liquid filled volume of the washing tank.

6. A process according to claim 1, characterised in that the liquid removed and supplied has from 10 to 90% of the concentration of chemicals of the chemical treatment situated between the point of removal and the point of supplying.

7. A process according to claim 1, characterised in that application of liquid removed from the downstream washing to the photographic material takes place above the level of the preceding washing tank.

8. A process according to claim 1, characterised in that the quantity of liquid removed amounts to 30 to 200 ml/m² of processed photographic material.

9. A process according to claim 1, characterised in that a wetting agent, a complex former, a biocide and/or an anti-oxidant are added to the liquid for washing.

* * * * *